United States Patent
Park

(10) Patent No.: US 9,825,456 B2
(45) Date of Patent: Nov. 21, 2017

(54) ELECTRONIC APPARATUS, POWER SUPPLY APPARATUS, AND POWER SUPPLY METHOD

(71) Applicant: Samsung Electronics Co., Ltd, Suwon-si, Gyeonggi-do (KR)

(72) Inventor: Jeong-gyu Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 358 days.

(21) Appl. No.: 14/071,986

(22) Filed: Nov. 5, 2013

(65) Prior Publication Data

US 2014/0132233 A1 May 15, 2014

(30) Foreign Application Priority Data

Nov. 9, 2012 (KR) ........................ 10-2012-0126915

(51) Int. Cl.
*H02H 7/12* (2006.01)
*H02M 1/38* (2007.01)
(Continued)

(52) U.S. Cl.
CPC ............ *H02H 7/1213* (2013.01); *H02M 1/38* (2013.01); *H02M 2001/0038* (2013.01); *H02M 2001/325* (2013.01); *H02M 2003/1586* (2013.01)

(58) Field of Classification Search
CPC . H02H 7/1213; H02H 7/1225–7/1227; H02M 1/38; G05F 1/569
See application file for complete search history.

(56) References Cited

U.S. PATENT DOCUMENTS

| 4,641,231 A | * | 2/1987 | Walker ................... H02M 1/38 327/440 |
| 5,408,150 A | | 4/1995 | Wilcox |

(Continued)

FOREIGN PATENT DOCUMENTS

| CN | 101499719 A | 8/2009 |
| CN | 101911490 A | 12/2010 |

(Continued)

OTHER PUBLICATIONS

PCT Search Report and Written Opinion issued in Application No. PCT/KR2013/009538 dated Feb. 25, 2014.

(Continued)

*Primary Examiner* — Stephen W Jackson
*Assistant Examiner* — Christopher Clark
(74) *Attorney, Agent, or Firm* — Staas & Halsey LLP

(57) ABSTRACT

An electronic apparatus, a power supply apparatus, and a power supply method. The electronic apparatus may include a controller to provide a control signal to generate a multiphase signal through conversion of an input power and to receive a feedback of an output voltage that is generated using the multiphase signal; and a power supply including a plurality of unit converters having upper and lower switching elements of a half or full-bridge type, being operated by the control signal, and configured to provide the output voltage by the multiphase signal generated according to driving of the plurality of unit converters, wherein the power supply detects whether the upper and lower switching elements are simultaneously turned on in the plurality of unit inverters and turns off the operation of the unit converters according to the detection result.

18 Claims, 10 Drawing Sheets

(51) Int. Cl.
  *H02M 1/00* (2006.01)
  *H02M 1/32* (2007.01)
  *H02M 3/158* (2006.01)

(56) References Cited

U.S. PATENT DOCUMENTS

| | | | |
|---|---|---|---|
| 5,412,557 A | 5/1995 | Lauw | |
| 5,831,807 A * | 11/1998 | Masannek | H02H 7/1227 361/100 |
| 5,847,554 A * | 12/1998 | Wilcox | H02M 3/1588 323/282 |
| 5,969,962 A * | 10/1999 | Gabor | H02M 1/4225 363/81 |
| 6,002,601 A | 12/1999 | Pappalardo et al. | |
| 6,134,128 A * | 10/2000 | Enzensberger | B60L 3/0023 363/51 |
| 8,106,640 B2 | 1/2012 | Itakura | |
| 8,363,440 B2 | 1/2013 | Tagome et al. | |
| 8,558,523 B2 | 10/2013 | Qiu et al. | |
| 8,976,543 B1 * | 3/2015 | Zheng | H02M 1/38 363/17 |
| 2002/0163820 A1 * | 11/2002 | Nakamura | H02H 7/1227 363/56.03 |
| 2003/0026111 A1 | 2/2003 | Steimer et al. | |
| 2007/0046274 A1 * | 3/2007 | Matsuoka | H02H 7/1225 323/283 |
| 2008/0316778 A1 | 12/2008 | Wagoner | |
| 2009/0160476 A1 * | 6/2009 | Omaru | H02H 7/1225 324/764.01 |
| 2010/0301784 A1 | 12/2010 | Tagome et al. | |
| 2011/0002073 A1 | 1/2011 | Fukuda et al. | |
| 2011/0121884 A1 | 5/2011 | Mazzola et al. | |
| 2011/0169470 A1 * | 7/2011 | Itakura | H02M 1/32 323/282 |
| 2011/0241640 A1 | 10/2011 | Qiu et al. | |

FOREIGN PATENT DOCUMENTS

| | | |
|---|---|---|
| CN | 102017386 A | 4/2011 |
| CN | 102160271 A | 8/2011 |
| EP | 0 895 343 A1 | 2/1999 |
| EP | 2 330 728 A1 | 6/2011 |
| JP | 2008-141612 | 6/2008 |
| KR | 10-0961078 | 6/2010 |
| TW | 281826 | 7/1996 |
| TW | 201206031 A1 | 2/2012 |
| WO | 2010/032333 | 3/2010 |

OTHER PUBLICATIONS

Extended European Search Report issued in Application No. 13192231.2 dated Mar. 14, 2014.
Chinese Office Action dated Feb. 22, 2017 in corresponding Chinese Patent Application No. 201310548149.9.
Taiwanese Office Action dated Dec. 26, 2016 in corresponding Chinese Patent Application No. 102139213.
Chinese Office Action dated Sep. 18, 2017 in corresponding Chinese Patent Application No. 201310548149.9.

* cited by examiner

ELECTRONIC APPARATUS, POWER SUPPLY APPARATUS, AND POWER SUPPLY METHOD

CROSS-REFERENCE TO RELATED APPLICATIONS

This application claims priority under 35 U.S.C. §119(a) to Korean Patent Application No. 10-2012-0126915, filed on Nov. 9, 2012, in the Korean Intellectual Property Office, the disclosure of which is incorporated herein by reference in its entirety.

BACKGROUND OF THE INVENTION

1. Field of the Invention

The present disclosure relates to an electronic apparatus, a power supply apparatus, and a power supply method, and more particularly to an electronic apparatus, a power supply apparatus, and a power supply method, which can prevent combustion of a switching element or power shutdown through sensing and using the short-circuit moment in an electronic apparatus, such as a computer or a server, having a high-integration multiphase VRM (Voltage Regulator Module).

2. Description of the Related Art

As an electronic device that is represented as an IT device having high function, high speed, and large scale, a large capacity power supply has been demanded. Particularly, in a personal computer or a communication device, a low-voltage CPU has been designed, and a power supply with low voltage and high current has been demanded. As a power supply that realizes the low voltage, high current, and high speed, there is a power supply that is composed of a multiphase converter circuit.

This kind of power supply in the related art includes a phase adjustment circuit and DC-to-DC (DC/DC) converters. The phase adjustment circuit sets switching phases of the respective DC/DC converters at equal intervals to make current obtained by synthesizing output current of the respective DC/DC converters flow to a load and to improve the ripple rate for the load.

In a power supply circuit that is currently used as a CPU or GPU core power supply or a chipset power supply, a high-performance FET or DrMOS has been used to control large current. In this case, in order to reduce an arrangement space, filter components arranged in the vicinity of a converter are designed to be small, and a switching frequency speed is heightened up to 1 MHz. Due to this, switches may deteriorate and cause problems thereof, and the life span thereof may be shortened. That is, as the impedance value thereof becomes large, inferiority may be further increased to cause such problems.

On the other hand, if high-speed switching of about 1 MHz is performed or a return path between a gate and a source is lengthened, unwanted voltage is generated at a gate terminal of a switching FET due to parasitic inductance components or the gate miller effect although a stable driving, such as a dead type or soft switching, is internally performed in the actual existing technology.

In this case, a short occurs for several tens or several hundreds of nanoseconds when upper and lower side FETs are simultaneously turned on, and this causes the inferiority, such as damage of the FETs, to occur. When such an instantaneous short occurs, the FETs may endure the short depending on their tolerance, but as such a bad condition continues, the switching FET elements may deteriorate to be damaged or burnt.

Recently, most PL (Product Liability) accidents in a mobile device, a PC, or a server are caused by the above-described inferiority due to the deterioration of the power switching elements.

SUMMARY OF THE INVENTION

The present disclosure addresses at least the above problems and/or disadvantages and to provide at least the features and utilities as described below. Accordingly, the present disclosure provides an electronic apparatus, a power supply apparatus, and a power supply method, which can prevent combustion of a switching element or power shutdown through sensing and using the short-circuit moment in an electronic apparatus, such as a computer or a server, having a high-integration multiphase VRM.

Additional features and utilities of the present general inventive concept will be set forth in part in the description which follows and, in part, will be obvious from the description, or may be learned by practice of the general inventive concept.

Exemplary embodiments of the present disclosure provide an electronic apparatus including a controller configured to provide a control signal to generate a multiphase signal through conversion of an input power and to receive a feedback of an output voltage that is generated using the multiphase signal; and a power supply including a plurality of unit converters having upper and lower switching elements of a half or full-bridge type, being operated by the control signal, and configured to provide the output voltage by the multiphase signal generated according to driving of the plurality of unit converters, wherein the power supply detects whether the upper and lower switching elements are simultaneously turned on in the plurality of unit inverters and turns off the operation of the unit converters according to the detection result.

The electronic apparatus according to an embodiment of the present disclosure may further include an interface configured to transfer power operation status information of the power supply that is generated according to the detection result to notify a system manager of malfunctions of the unit converters.

The power supply may further include a power inputter configured to turn on/off the input power to be provided by unit converters, and turn off the power inputter that is in an on state to turn off the operation of the unit converters.

The power supply may disenable the upper and lower switching elements to turn off the operation of the unit converters.

The power supply may further include a power inputter configured to turn on/off the input power for being provided by unit converters, wherein the controller turns off the power inputter that is in an on state by means of a control signal that is generated using the detection result provided from the power supply to turn off the operation of the unit converters.

The controller may disenable the upper and lower switching elements by means of a control signal that is generated using the detection result provided from the power supply to turn off the operation of the unit converters.

The power supply may include a voltage converter including the plurality of unit converters and configured to convert the input power into the multiphase signal and to generate and provide the converted multiphase signal as the output voltage, and a short detector configured to detect whether the upper and lower switching elements are simultaneously turned on in the plurality of unit converters and to provide the detection result.

The short detector may include a reference voltage provider configured to provide reference voltages for determining shorts of the upper and lower switching elements, and a comparator configured to generate the results of comparison of intermediate node voltages of the upper and lower switching elements with the respective reference voltages and to provide the generated comparison results to turn off the operation of the unit converters.

The short detector may further include an operation detector configured to provide the intermediate node voltages to the comparator when the upper and lower switching elements are simultaneously turned on to discriminate malfunctions of the upper and lower switching elements.

Exemplary embodiments of the present disclosure also provide a power supply apparatus to provide an output voltage that is generated using a multiphase signal, which includes a voltage converter including a plurality of unit converters having upper and lower switching elements of a half or full-bridge type and configured to generate the multiphase signal according to driving of the plurality of unit converters; and a short detector configured to detect whether the upper and lower switching elements are simultaneously turned on in the plurality of unit inverters and to turn off the operation of the unit converters according to the detection result.

The voltage converter may further include a power inputter configured to turn on/off the input power to be provided by unit converters, wherein the short detector turns off the power inputter that is in an on state to turn off the operation of the unit converters.

The short detector may disenable the upper and lower switching elements to turn off the operation of the unit converters.

The short detector may include a reference voltage provider configured to provide reference voltages to determine shorts of the upper and lower switching elements, and a comparator configured to generate the results of comparison of intermediate node voltages of the upper and lower switching elements with the respective reference voltages and to output the generated comparison results to turn off the operation of the unit converters.

The short detector may further include an operation detector configured to provide the intermediate node voltages to the comparator when the upper and lower switching elements are simultaneously turned on to discriminate malfunctions of the upper and lower switching elements.

The short detector may include a logic circuit configured to detect whether the upper and lower switching elements are simultaneously turned on using control signals that are applied to the upper and lower switching elements, and a switcher configured to operate in response to detection signals from the logic circuit when the shorts occur in the upper and lower switching elements to output the intermediate node voltages.

The comparator may include a first comparator configured to compare the intermediate node voltage that is provided when the short occurs in the lower switching element with the reference voltage to determine the short occurrence in the lower switching element to output the comparison result, and a second comparator configured to compare the intermediate node voltage that is provided when the short occurs in the upper switching element with the reference voltage to determine the short occurrence in the upper switching element to output the comparison result.

The short detector may further include a signal outputter configured to provide the output result that is generated through logical combination of the comparison results of the first comparator and the second comparator as the detection result.

The short detector may further include an amplifier configured to amplify the intermediate node voltages and to provide the amplified intermediate node voltages to the comparator.

The short detector may further include a filter configured to remove noises of the intermediate node voltages and to provide the noise-removed intermediate node voltages to the amplifier.

Exemplary embodiments of the of the present disclosure also provide a power supply method which includes: causing a voltage converter that includes a plurality of unit converters to generate a multiphase signal to generate the multiphase signal through conversion of an input power and to generate and provide an output voltage by means of the generated multiphase signal; detecting whether upper and lower switching elements of a half or full-bridge type by the unit converters are simultaneously turned on; and turning off the operation of the unit converters according to the detection result.

The turning off the operation of the unit converters may intercept the input power that is input to the unit converters.

The turning off the operation of the unit converters may disenable the upper and lower switching elements.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
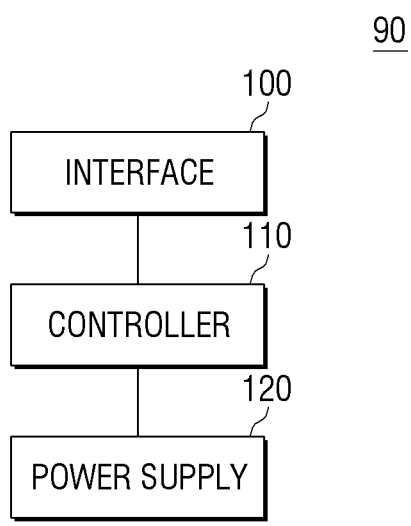
FIG. 1 is a block diagram illustrating the configuration of an electronic apparatus according to an embodiment of the present disclosure.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
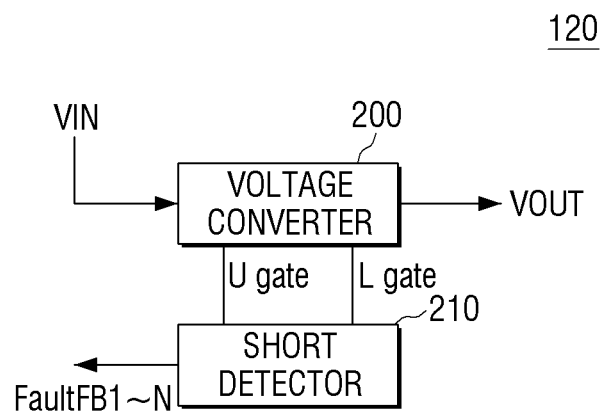
FIG. 2 is a block diagram illustrating the detailed configuration of a power supply in FIG. 1.

FIG. 1 is a block diagram illustrating the configuration of an electronic apparatus according to an embodiment of the present disclosure, and FIG. 2 is a block diagram illustrating the detailed configuration of a power supply (or a power supply device) in FIG. 1.

As illustrated in FIGS. 1 and 2, an electronic apparatus 90 according to an exemplary embodiment of the present disclosure is an apparatus, such as a computer, an image display device, or a server, and may include a part or the whole of an interface 100, a controller 110, and a power supply 120.

Here, inclusion of a part or the whole means that a partial constituent element, such as the interface 100, may be omitted or a partial constituent element may be integrated into another constituent element to configure a specific electronic apparatus. For full understanding of the present disclosure, it is described that the electronic apparatus includes all the constituent elements.

The interface 100 may include a communication interface or a user interface. The communication interface is a portion to link with an external device, and may serve to transfer power operation status information so that the power operation status of the power supply 120 can be monitored in real time through the external device, for example, a PC that a system manager uses. Further, the user interface may include an inputter to enable a user to input a command through a button or the like and a display to display specific information on a screen. The user command may be input even by a touch of the display.

The controller 110 takes charge of the overall control of the interface 100 and the power supply 120 constituting the electronic apparatus 90. For example, the controller 110 may control the interface to transfer the power operation status information related to detection signals (or the detection results) provided from the power supply 120 to the external device. Further, although the controller 110 will be described in detail later, the controller 110 may operate to stop, that is, to turn off the operation of a specific unit converter based on the detection signals provided from the power supply 120. Here, such a unit converter may be one of a plurality of unit converters to generate a multiphase signal, and the stop operation may include stopping of the performance of the unit converter only at a moment when a short occurs in a switching element of the unit converter.

The power supply 120 according to an embodiment of the present disclosure may receive and convert an external input power and provide the converted power of large current to the controller 110 as a feedback. In other words, the power supply 120 may convert the input power into the multiphase signal, and provide the voltage of high current that is generated using the converted multiphase signal to the controller 110. Since it is also possible to provide the voltage of high current to a peripheral device rather than the controller 110 without limit, the present disclosure is not limited to the case where the controller 110 receives the voltage of high current as a feedback.

Further, the power supply 120 according to an embodiment of the present disclosure includes a voltage converter 200 that may include a plurality of unit converters that generate the multiphase signals. The power supply 120 may further include a part or the whole of a power inputter configured to turn on/off the input power that is provided by unit converters, and a voltage outputter configured to output the voltage of high current through synthesis of the multiphase signals, for example, the current. According to an embodiment of the present disclosure, the power inputter and the voltage outputter may be included in the unit converter. The unit converter according to an embodiment of the present disclosure is, for example, a DC/DC converter, and may include upper and lower switching elements of a half or full-bridge type. In this case, the upper and lower switching elements of the half-bridge type may be called poles.

The power supply 120 according to an embodiment of the present disclosure further includes a short detector 210 configured to detect the moment when shorts occur in the switching elements of the unit converter. For example, when the shorts occur in a specific unit converter, the power supply 120 may directly control the power inputter through the short detector 210 or may directly disenable the switching elements in the unit converter. In this case, the control of the power inputter and the disenabling operation of the switching elements can be performed only at the moment when the shorts occur. In addition, the power supply 120 may provide detection signals of the short detector 210 to the controller 110 so that the power inputter is controlled under the control of the controller 110 or the switching elements in the unit converter can be disenabled.

Further, the power supply 120 can discriminatingly detect malfunctions, that is, shorts, of the upper and lower switching elements through the short detector 210. In other words, the malfunctions of the switching elements can be discriminatingly detected in a short detection method only when the upper switching element operates (or the short occurs in the lower switching element) or only when the lower switching element operates (or the short occurs in the upper switching element). The power operation status information for the malfunctions as discriminated above may be transferred to an external manager to be efficiently used during repairing of the power system.

Up to now, it is described that the power supply 120 is configured as a part of the electronic apparatus 90. However, the present disclosure is not limited thereto, but the power supply 120 may form an independent power supply device without limit. For example, the power supply device may include an IC chip or a device such as a power supply. In this regard, the voltage converter 200 and the short detector 210 in FIG. 2 may be the configuration of the power supply device.

Figure 3:
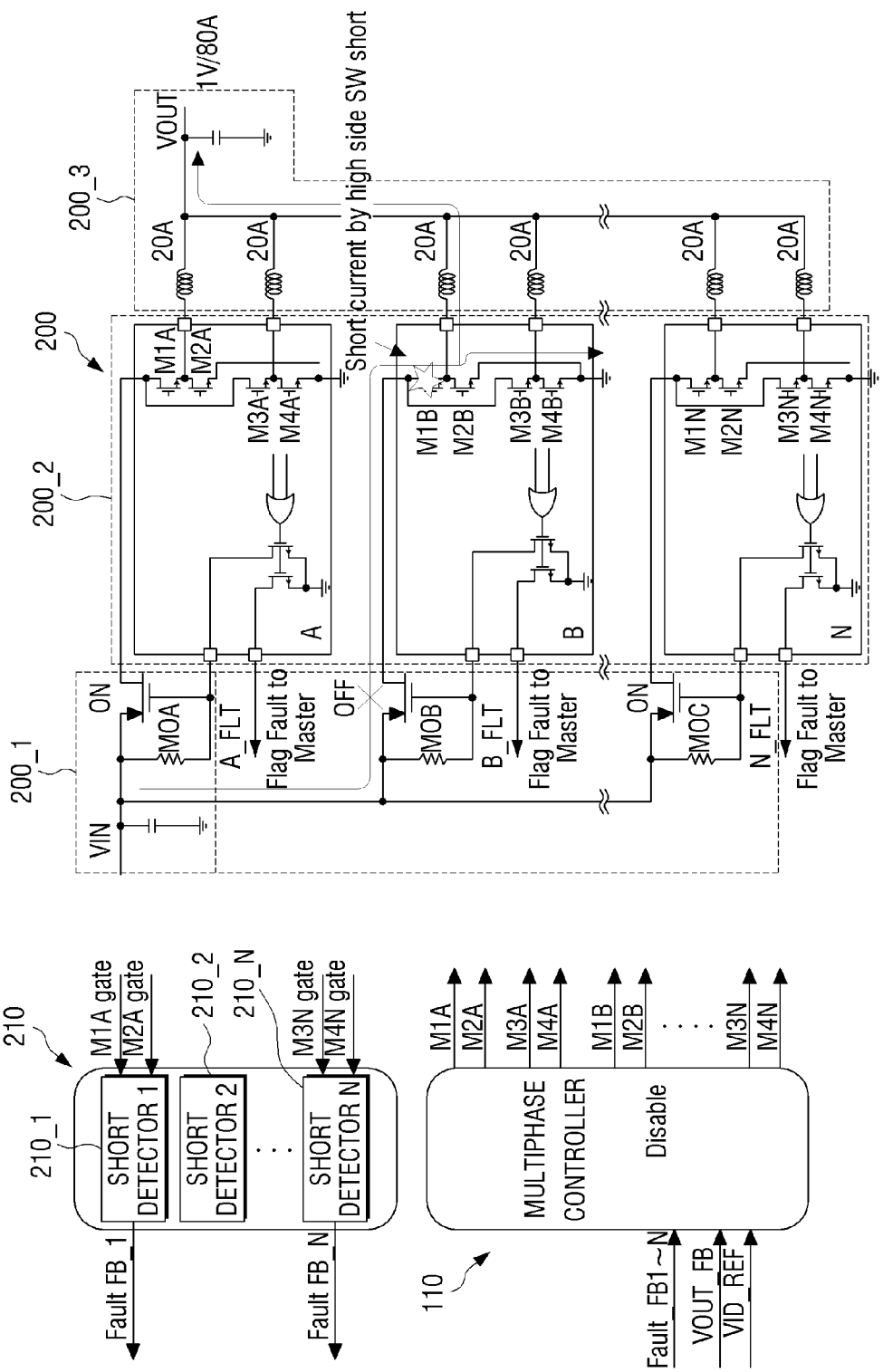
FIG. 3 is a circuit diagram illustrating an example of a controller and a power supply in FIG. 1.

FIG. 3 is a circuit diagram illustrating an example of a controller and a power supply in FIG. 1

Referring to FIGS. 1, 2, and 3, a case where the short detector 210 in FIG. 2 controls the voltage converter 200 through providing of detection signals Fault_FB 1~N to the controller 110 will be described as an example.

As described above, in the case where the short detector 210 directly controls the voltage converter 200 without the help of the controller 110, the controller 110 may be omitted. In this case, since the short detector 210 directly controls the voltage converter 200, the short occurrence can be promptly stopped.

More specifically, as a multiphase controller as shown in FIG. 3, the controller 110 may generate a plurality of control signals M1A to M4N to control the plurality of switching elements constituting the unit converter and provide the generated control signals to the voltage converter 200. Further, the controller 110 may receive an output voltage VOUT of high current that is output from the voltage converter 200 as a feedback, and may control the power inputter 200_1 of the voltage converter 200 based on the detection signals Fault_FB 1~N provided from the short detector 210 or disenable the switching elements in the unit converter.

The voltage converter 200 may include a part or the whole of a power inputter 200_1, a converter 200_2, and a voltage outputter 200_3. Here, inclusion of a part or the whole means the same as described above.

The power inputter 200_1 may include a capacitor charging the input power, switching elements to control the input power by the unit converters of the converter 200_2, and resistors to constantly supply a turn-on voltage Vgs to the switching elements. In this case, depending on the embodiments of the present disclosure, the switching elements may be omitted. For example, in the case where the short detector 210 of FIG. 2 directly controls the voltage converter 200, the switching elements may be omitted.

Further, the converter 200_2 includes a plurality of unit converters. The unit converters may include, as seen from FIG. 3, upper and lower switching elements of a full-bridge type, and may further include switching elements and logic gates to control the power inputter 200_1. Here, in the case where it is not necessary to control the input power that is input to the unit converters, the switching elements and the logic gates may be designed to be omitted, and at least one of the switching elements and the logic gates may be configured as a part of the short detector 210.

The voltage outputter 200_3 may include a plurality of inductors and a capacitor to stably provide the output voltage. The inductor has one end that is connected to an intermediate node of the upper and lower switching elements of the half-bridge type and the other end that is connected to one side of the capacitor, and the other side of the capacitor is grounded. The output voltage of the voltage outputter 200_3 becomes a voltage between both terminals of the capacitor.

The short detector 210 may include N short detectors 210_1 to 210_N. In this case, the short detector 1 210_1 to the short detector N 210_N may be called unit short detectors, and in the case where the unit converter is of a full-bridge type as shown in FIG. 3, sub-short detectors to control the half-bridge type switching elements may be provided. In other words, according to an embodiment of the present disclosure, the unit converter may include at least the half-bridge type upper and lower switching elements, and it is preferable that the sub-short detector controls the upper and lower switching elements. Through this, the respective short detectors 210_1 to 210_N may detect the short states of the half-bridge type upper and lower switching elements and provide the detection signals to the controller 110. In this case, the respective short detectors 210_1 to 210_N may detect the short states of the switching elements using control signals M1A to M4N that are applied to the upper and lower switching elements. Further, the short detector 210 may discriminatingly detect the malfunctions of the upper and lower switching elements through detection of the malfunctions only when a section occurs, in which the upper and lower switching elements in an off state are turned on due the shorts. Here, in the case where the upper and lower switching elements are configured in a DrMOS type, the respective short detectors 210_1 to 210_N (or detection signals) may be ORing with OTP (Over Temperature Protection), or may be configured to operate independently.

According to the above-described configuration, the controller 110 provides a plurality of control signals to complementarily operate the full-bridge type switching elements in the voltage converter 200, and more accurately, in the unit converter, and the voltage converter 200 operates the plurality of unit converters using the plurality of control signals to generate the multiphase signals through conversion of the input power, and provides the output voltage of high current obtained by synthesizing the multiphase signals. In this case, the short detector 210 detects whether the shorts occur in the switching elements of the unit converter or the moment when the shorts occur and provides the detection signals to the controller 110. The controller 110 turns off the operation of the unit converters based on the detection signals of the short detector 210. For example, as shown in FIG. 3, the controller 110 may intercept the input power that is input to the unit converters through controlling of the switching elements of the power inputter 200_1. In this case, the interception of the input power may continue until the short problem is solved or may be temporary.

Figure 4:
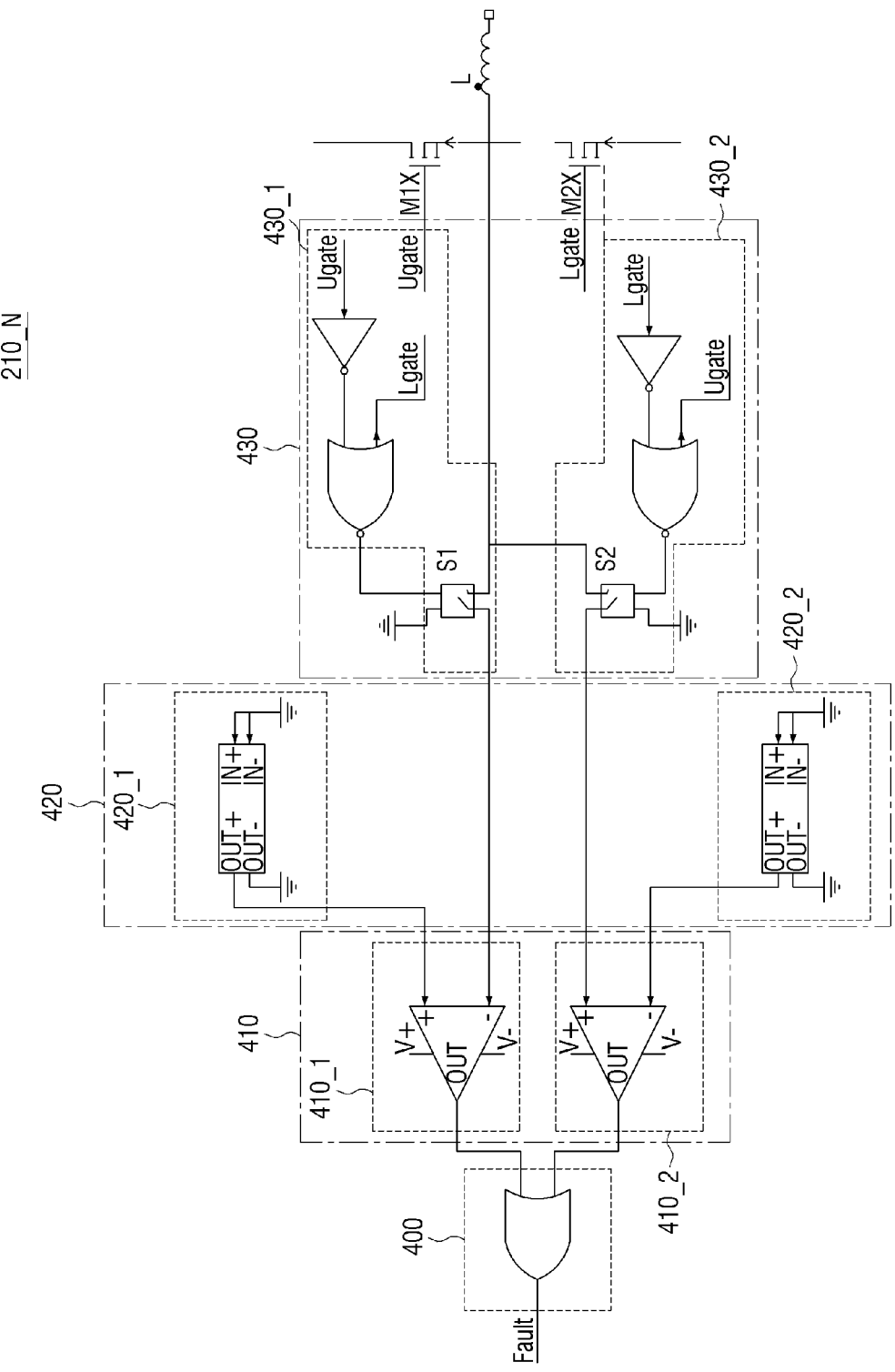
FIG. 4 is a circuit diagram illustrating an example of a sub-short detector in FIG. 3.

FIG. 4 is a circuit diagram illustrating an example of a sub-short detector in FIG. 3, and FIGS. 5A to 5C are waveform diagrams explaining the operation of the sub-short detector of FIG. 4. FIGS. 6 and 7 are diagrams illustrating a voltage waveform of a comparator in FIG. 5 and a detection signal waveform of a signal outputter through simulations.

As illustrated in FIG. 4, the short detector 201_N (or the unit short detector) in FIG. 3, more accurately, the sub-short detector, may include a part or the whole of a signal outputter 400, a comparator 410, a reference voltage provider 420, and an operation detector 430.

The signal outputter 400 includes, for example, an OR gate. The signal outputter 400 performs logic combination, that is, logic sum, of the comparison results of the comparator 1 410_1 and the comparator 2 410_2 in the comparator 410. In this case, the output signal (or the detection result) may be provided to the controller 110 as shown in FIG. 3.

The comparator 410 includes comparator 1 410_1 and comparator 2 410-2. Here, the comparator 1 410_1 receives and compares the intermediate node voltage of the upper and lower switching elements of the half-bridge type with the reference voltage provided from a reference voltage provider 1 420_1, and provides the comparison result to the signal outputter 400. Further, the comparator 2 410_2 receives and compares the intermediate node voltage of the upper and lower switching elements of the half-bridge type with the reference voltage provided from a reference voltage provider 2 420_2, and provides the comparison result to the signal outputter 400. In this case, the intermediate node voltage may be a voltage corresponding to ½ of the input voltage VIN. Here, the comparator may be a normal or inverse type hysteresis comparator to strongly design the comparator against noises or the like.

The reference voltage provider 420 includes the reference voltage provider 1 420_1 and the reference voltage provider 2 420_2. The reference voltage provider 1 420_1 provides a constant reference voltage during the short of the lower switching element, and the reference voltage provider 2 420_2 provides a constant reference voltage during the short of the upper switching element. At this time, the reference voltage that is provided from the reference voltage provider 1 420_1 may be a voltage that corresponds to ⅔ of the input voltage VIN, and the reference voltage provided from the reference voltage provider 2 420_2 may be a voltage that corresponds to ⅓ of the input voltage VIN. Such voltages may be initially set by a system designer to be provided. In the case of providing the reference voltages set as described above, the design implementation of the power IC may be facilitated. The reference voltages provided from the reference voltage provider 1 420_1 and the reference voltage provider 2 420_2 may be sensed voltages obtained by sensing both terminals of the lower switching element and the upper switching element.

The operation detector 430 includes an operation detector 1 430_1 and an operation detector 2 430_2. The operation detector 1 430_1 receives the control voltages of the upper and lower switching elements and detects the short of the lower switching element. For example, the lower switching element is normally kept in a low state, but may be kept in a high state due to the short. At this time, the operation detector 1 430_1 provides the intermediate node voltage to the comparator 1 410_1. For example, if a high-level signal is output from a NOR gate of the operation detector 1 430_1, the switching element S1 may provide the intermediate node voltage. On the other hand, the operation detector 2 430_2 receives the control voltages of the upper and lower switching elements and detects the short of the upper switching element. For example, the upper switching element is normally kept in a low state, but may be kept in a high state due to the short occurrence. At this time, the operation detector 2 430_2 provides the intermediate node voltage to the comparator 2 410_2. In other words, if a high-level signal is output from a NOR gate of the operation detector 2 430_2, the switching element S2 may provide the intermediate node voltage.

Figure 5A:
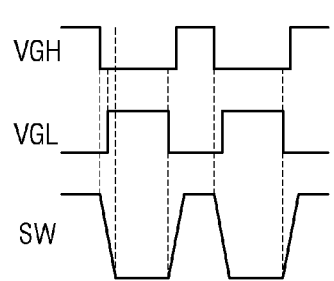
FIGS. 5A to 5C are waveform diagrams explaining the operation of the sub-short detector of FIG. 4.
Figure 5B:
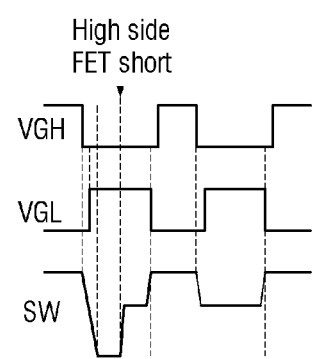
Figure 5C:
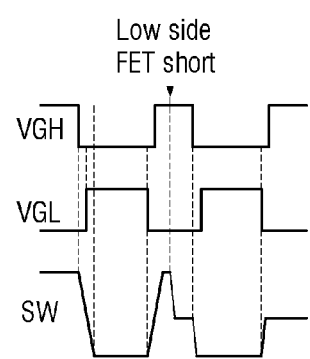
Figure 6:
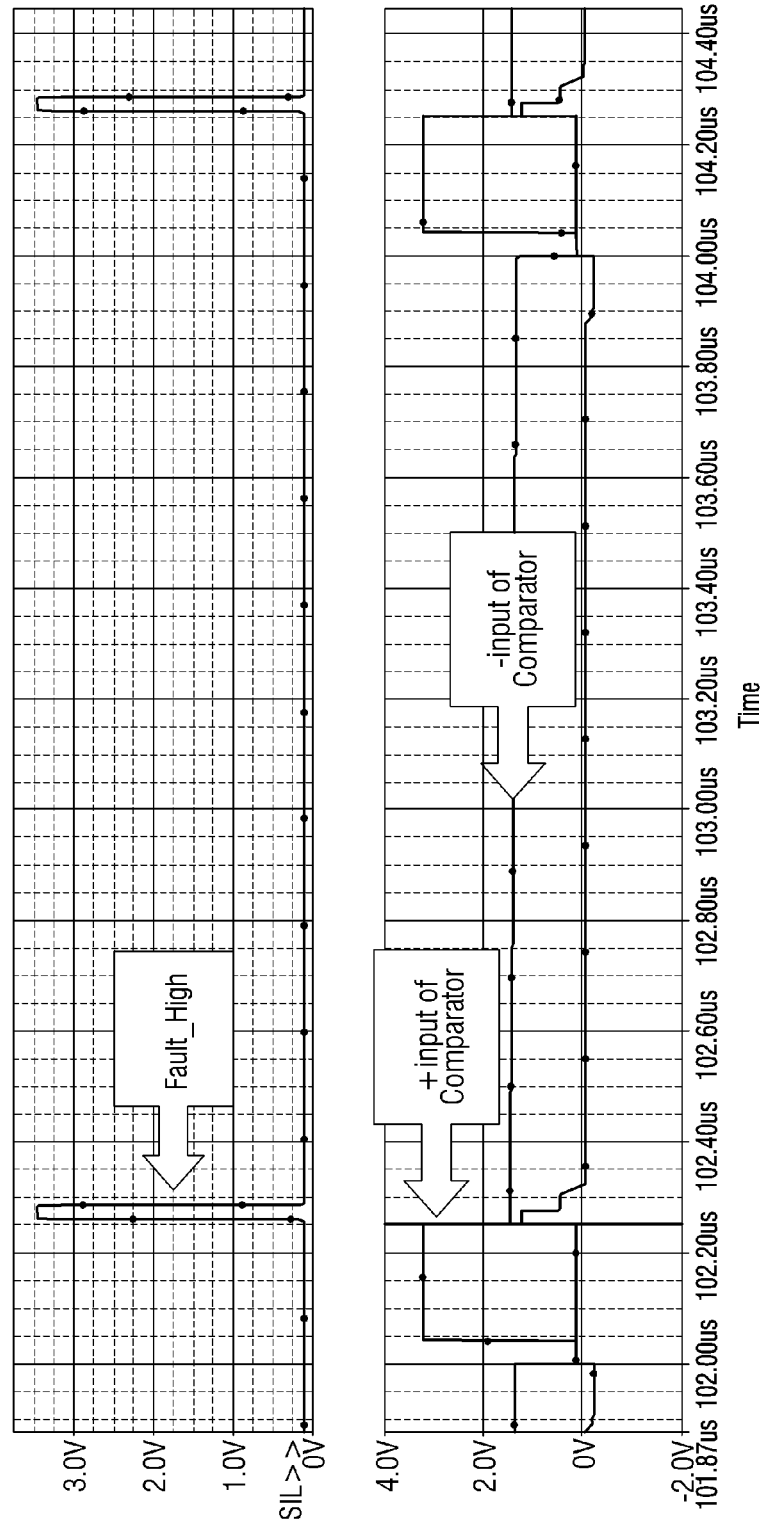
FIGS. 6 and 7 are diagrams illustrating a voltage waveform of a comparator in FIG. 5 and a detection signal waveform of a signal outputter through simulations.
Figure 7:
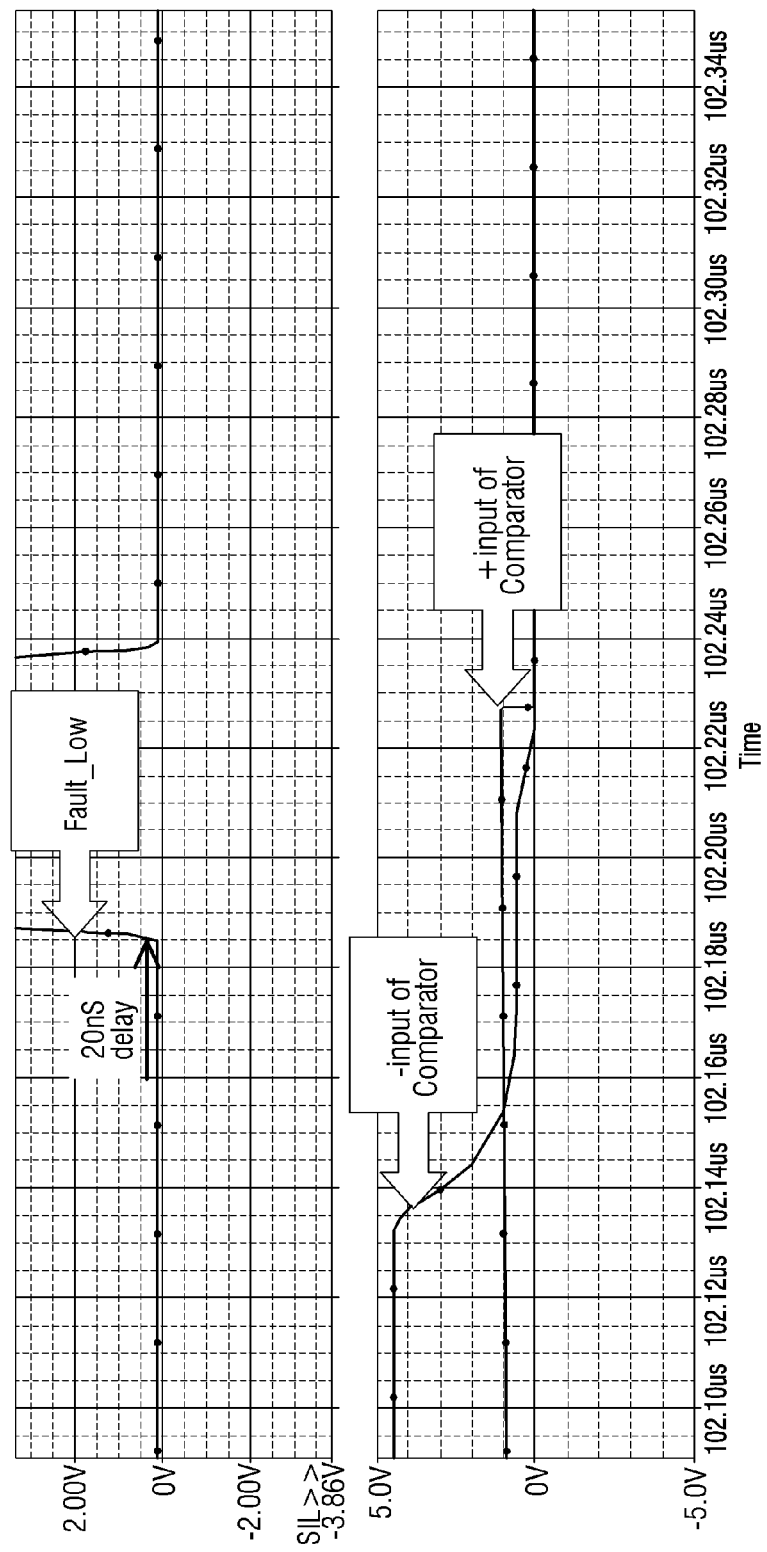

Referring to FIGS. 5A to 7, if a high-level signal is applied to the half-bridge type upper switching element as shown in FIG. 5A and a low-level signal is applied to the lower switching element, that is, if the upper and lower switching elements operate complementarily, the intermediate node voltage SW is kept at a normal level.

In this process, if a short occurs in the upper switching element, the upper switching element is normally kept at a low level, but in some sections, it is kept at a high level. Accordingly, the upper and lower switching elements are simultaneously turned on to cause the occurrence of the shorts. At this time, the intermediate node voltage SW is kept in a form as shown in FIG. 5B. In other words, when the shorts occur in the upper and lower switching elements, very large current passes from the input power to the ground, and a constant voltage appears due to the impedance of the switching elements.

If a short occurs in the lower switching element, the lower switching element is normally kept at a low level, but in some sections, it is kept at a high level. Accordingly, the upper and lower switching elements are simultaneously turned on, and the intermediate node voltage SW is kept in a form as shown in FIG. 5C.

As described above, if the upper and lower switching elements are simultaneously turned on to cause the occurrence of the short, more accurately, if the short occurs in the lower switching element, the comparator 1 410_1 of FIG. 4 receives an input of voltages as shown in the lower portion of FIG. 6 through its inverting and non-inverting terminals, and the signal outputter 400 outputs a voltage as shown in the upper portion of FIG. 6, that is, a detection signal Fault_High. At this time, the voltage input to the inverting terminal becomes the intermediate node voltage, and the voltage input to the non-inverting terminal becomes the reference voltage. Here, the detection signal Fault_High may be output if the reference voltage, which corresponds to ⅔×VIN, input to the non-inverting terminal is higher than the intermediate node voltage, which corresponds to ½× VIN.

If the short occurs in the upper switching element, the comparator 2 410_2 of FIG. 4 receives an input of voltages as shown in the lower portion of FIG. 7 through its inverting and non-inverting terminals. Then, the signal outputter 400 outputs a detection signal Fault_Low as shown in the upper portion of FIG. 7. At this time, the detection signal Fault_ Low may be output if the reference voltage, which corresponds to ⅓×VIN, input to the non-inverting terminal is lower than the intermediate node voltage, which corresponds to ½×VIN.

Figure 8:
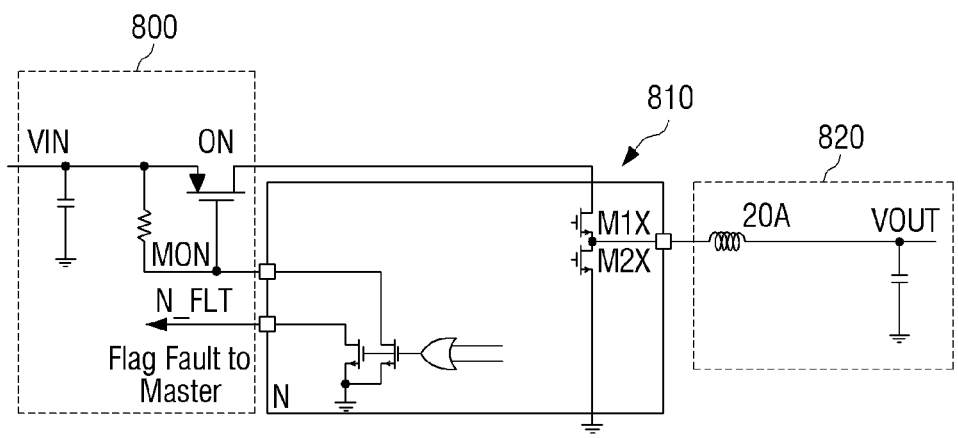
FIG. 8 is a circuit diagram illustrating a modified example of a unit voltage converter in FIG. 3.

FIG. 8 is a circuit diagram illustrating a modified example of a unit voltage converter in FIG. 3.

As illustrated in FIG. 8, the voltage converter 200 of FIG. 2 according to an embodiment of the present disclosure may include a part or the whole of a power inputter 800, a half-bridge type unit converter 810, and a voltage outputter 820.

If the unit converter is configured of a full-bridge type in the voltage converter 200 of FIG. 3, the unit converter of FIG. 8 differs from the unit converter of FIG. 3 on the point that it includes half-bridge type upper and lower switching elements.

Except for this point, the contents related to the power inputter 800, the unit converter 810, and the voltage outputter 820 are not greatly different from those of the power inputter 200_1, the converter 200_2, and the voltage outputter 200_3 of FIG. 3, and the description of the same contents will be omitted.

Figure 9:
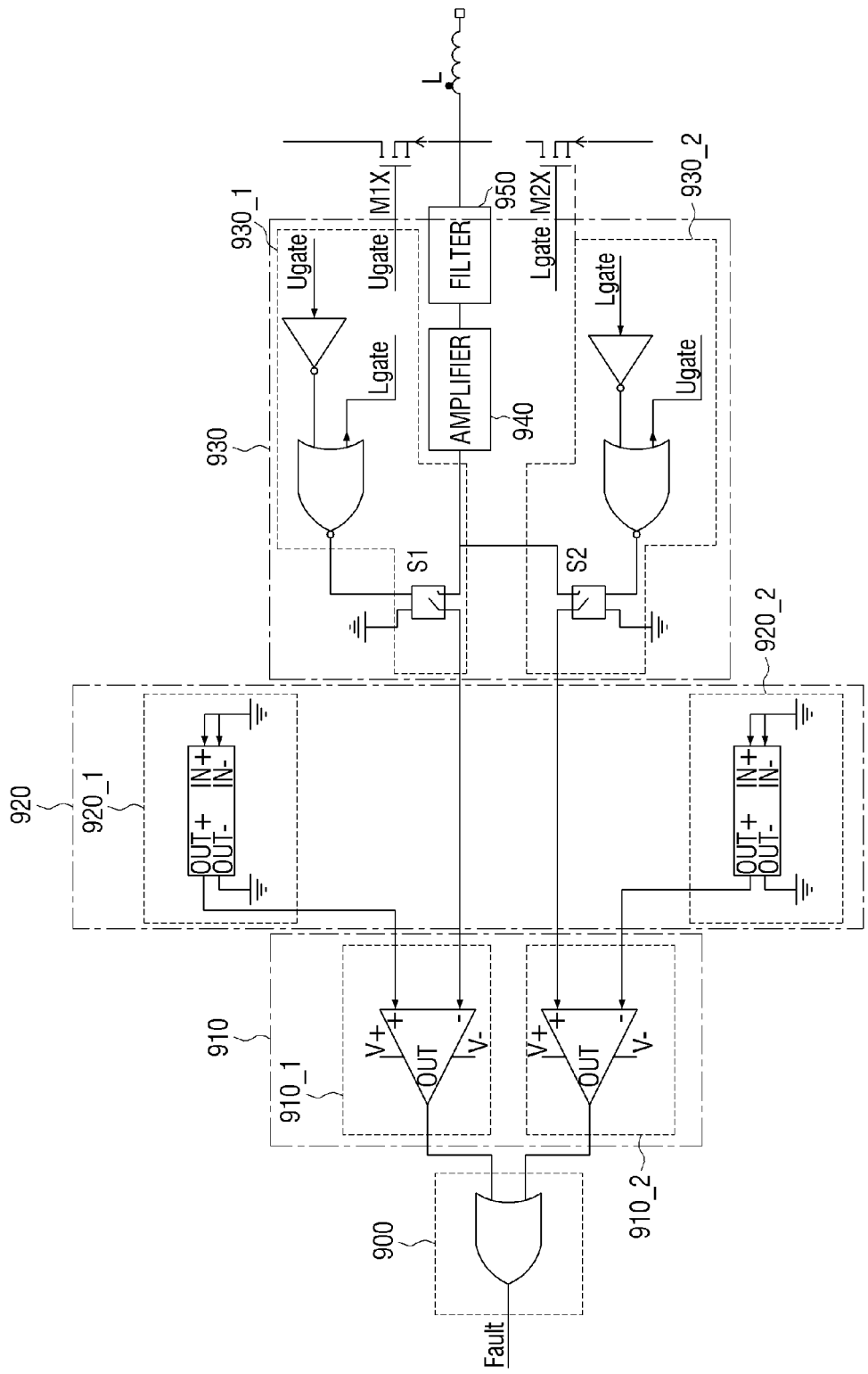
FIG. 9 is a circuit diagram illustrating a modified example of the sub-short detector of FIG. 4.

FIG. 9 is a circuit diagram illustrating a modified example of the sub-short detector of FIG. 4.

The unit short detector 210_N of FIG. 9, more accurately, the sub-short detector, may include a part or the whole of a logic circuit 900, a comparator 910, a reference voltage provider 920, a detector 930, an amplifier 940, and filter 950. Here, the inclusion of a part or the whole means that at least one of the amplifier 940 and the filter 950 is included.

The intermediate node voltage may have a very low level depending on the configuration of the switching elements and the trouble conditions. In this case, the amplifier 940 amplifies the input intermediate node voltage and applies the amplified intermediate node voltage to the comparator 910.

The filter 950 serves to remove noises of the intermediate node voltage. Thereafter, the noise-removed intermediate node voltage may be provided to the amplifier 940.

Except for the above-described point, the technical contents of the signal outputter 900, the comparator 910, the reference voltage provider 920, and the detector 930 are not greatly different from those of the signal outputter 400, the comparator 410, the reference voltage provider 420, and the detector 430, and the description thereof will be omitted.

The electronic apparatus or the power supply apparatus according to an embodiment of the present disclosure as configured above can accurately detect the moment when the short occurs within several tens of nanoseconds, and thus the system can operate stably.

Figure 10:
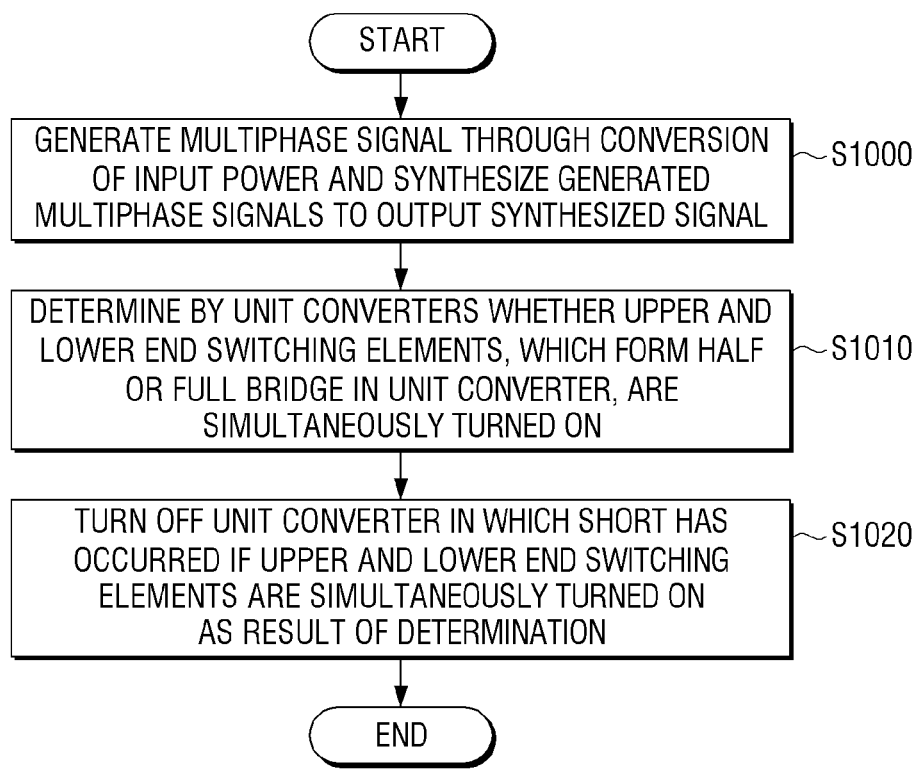
FIG. 10 is a flowchart illustrating a power supply method according to an embodiment of the present disclosure.

FIG. 10 is a flowchart illustrating a power supply method according to an embodiment of the present disclosure.

For convenience in explanation, referring to FIG. 10 together with FIGS. 2 and 3, according to the power supply apparatus according to an embodiment of the present disclosure, the voltage converter 200 including a plurality of unit converters generates the multiphase signals through conversion of the input power, and outputs a voltage of high current through synthesis of the generated multiphase signals (operation S1000). Here, the unit converter may include the upper and lower switching elements of a half or full-bridge type.

The voltage supply apparatus determines whether the upper and lower switching elements are simultaneously turned on, that is, the shorts occur, by unit converters (operation S1010). This determination process may be performed through comparison of the reference voltage, which is obtained by sensing the voltage between both terminals of the upper or lower switching element when the short occurs or by predetermining an expected voltage during designing of the system, with the intermediate node voltage of the upper and lower switching elements. In this process, the voltage supply apparatus discriminatingly determines the malfunctions of the upper and lower switching elements, and outputs the detection signals according to the determination results. Since the operation related to this has been fully described, further description thereof will be omitted.

If it is determined that the short occurs in a specific unit converter, the voltage supply apparatus turns off the operation of the corresponding unit converter (operation S1020). Here, the turning off of the operation of the unit converter includes interception of the input power that is input to the unit converter and disenabling of the upper and lower switching elements.

By the above-described failover operation (or design) according to the embodiments of the present disclosure, the power system can operate stably.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An electronic apparatus, comprising:
a controller configured to provide a control signal to generate a multiphase signal through conversion of an input power and to receive a feedback of an output voltage that is generated using the multiphase signal; and
a power supply including a plurality of unit converters each having upper and lower switching elements of a half or full-bridge type, being operated by the control signal, and configured to provide the output voltage by the multiphase signal generated according to driving of the plurality of unit converters,
wherein the power supply detects whether the upper and lower switching elements of respective unit converters are simultaneously conducting in the plurality of unit converters and temporarily stops operation of the respective unit converters at a moment when a short occurs in a switching element based on the detection result, and
wherein the controller is further configured to receive the detection result from the power supply, determine which of the upper and lower switching elements of the respective unit converters are simultaneously conducting based on the detection result, and disable the determined upper and lower switching elements by means of a control signal that is generated to turn off the operation of the respective unit converters.

2. The electronic apparatus as claimed in claim 1, further comprising:
an interface configured to transfer power operation status information of the power supply that is generated according to the detection result to notify a system manager of malfunctions of the unit converters.

3. The electronic apparatus as claimed in claim 1, wherein the power supply further comprises:
a power inputter configured to turn on/off the input power to be respectively provided to unit converters, and
the power supply turns off the power inputter that is in an on state to turn off the operation of each of the unit converters.

4. The electronic apparatus as claimed in claim 1, wherein the power supply further comprises:
a power inputter configured to turn on/off the input power for being respectively provided to unit converters,
wherein the controller turns off the power inputter that is in an on state by means of the control signal that is generated using the detection result provided from the power supply to turn off the operation of each of the unit converters.

5. The electronic apparatus as claimed in claim 1, wherein the power supply comprises:
a voltage converter including the plurality of unit converters and configured to convert the input power into the multiphase signal and to generate and provide the converted multiphase signal as the output voltage; and
a short detector configured to detect whether the upper and lower switching elements are simultaneously turned on in the plurality of unit converters and to provide the detection result.

6. The electronic apparatus as claimed in claim 5, wherein the short detector comprises:
a reference voltage provider configured to respectively provide reference voltages to determine shorts of the upper and lower switching elements; and
a comparator configured to generate the results of comparison of intermediate node voltage of the upper and lower switching elements with the respective reference voltages and to stop operation of each of the unit converters by providing the generated comparison results.

7. The electronic apparatus as claimed in claim 6, wherein the short detector further comprises:
an operation detector configured to provide the intermediate node voltage to the comparator when the upper and lower switching elements are simultaneously conducting to discriminate malfunctions of the upper and lower switching elements.

8. A power supply apparatus to provide an output voltage that is generated using a multiphase signal, comprising:
a voltage converter including a plurality of unit converters each having upper and lower switching elements of a half or full-bridge type and configured to generate the multiphase signal according to driving of the plurality of unit converters;
a short detector configured to detect whether the upper and lower switching elements of respective unit converters are simultaneously conducting in the plurality of unit converters and to temporarily stop operation of the respective unit converters at a moment when a short occurs in a switching element based on the detection result; and
a controller configured to receive the detection result from the short detector, determine which of the upper and lower switching elements of the respective unit converters are simultaneously conducting based on the detection result, and disable the determined upper and lower switching elements by means of a control signal that is generated to turn off the operation of the respective unit converters.

9. The power supply apparatus as claimed in claim 8, wherein the voltage converter further comprises a power inputter configured to turn on/off the input power to be respectively provided to unit converters,
wherein the short detector turns off the power inputter that is in an on state to turn off the operation of each of the unit converters.

10. The power supply apparatus as claimed in claim 8, wherein the short detector comprises:
- a reference voltage provider configured to respectively provide reference voltages to determine shorts of the upper and lower switching elements; and
- a comparator configured to generate the results of comparison of intermediate node voltage of the upper and lower switching elements with the respective reference voltages and to output the generated comparison results to stop operation of the unit converters.

11. The power supply apparatus as claimed in claim 10, wherein the short detector further comprises an operation detector configured to provide the intermediate node voltage to the comparator when the upper and lower switching elements are simultaneously conducting to discriminate malfunctions of the upper and lower switching elements.

12. The power supply apparatus as claimed in claim 11, wherein the short detector comprises:
- a logic circuit configured to detect whether the upper and lower switching elements are turned on using control signals that are applied to the upper and lower switching elements; and
- a switcher configured to output the intermediate node voltage by operating in response to a detection signal from the logic circuit when the shorts occur in the upper and lower switching elements.

13. The power supply apparatus as claimed in claim 10, wherein the comparator comprises:
- a first comparator configured to compare the intermediate node voltage that is provided when the short occurs in the lower switching element with the reference voltage to determine the short occurrence in the lower switching element to output the comparison result; and
- a second comparator configured to compare the intermediate node voltage that is provided when the short occurs in the upper switching element with the reference voltage to determine the short occurrence in the upper switching element to output the comparison result.

14. The power supply apparatus as claimed in claim 13, wherein the short detector further comprises:
- a signal outputter configured to provide the output result that is generated through logical combination of the comparison results of the first comparator and the second comparator as the detection result.

15. The power supply apparatus as claimed in claim 10, wherein the short detector further comprises:
- an amplifier configured to amplify the intermediate node voltage and to provide the amplified intermediate node voltages to the comparator.

16. The power supply apparatus as claimed in claim 15, wherein the short detector further comprises:
- a filter configured to remove noises of the intermediate node voltage and to provide the noise-removed intermediate node voltages to the amplifier.

17. A power supply method, comprising:
- generating, by a voltage converter that includes a plurality of unit converters to generate a multiphase signal, the multiphase signal through conversion of an input power and to generate and provide an output voltage by means of the generated multiphase signal;
- detecting, by the voltage converter, whether upper and lower switching elements of a half or full-bridge type of respective unit converters are simultaneously conducting and outputting a detection result;
- temporarily stopping, by the voltage converter, operation of the respective unit converters experiencing a simultaneous conduction at the moment when a short occurs in a switching element based on the detection result;
- determining, by a controller, which of the upper and lower switching elements of the respective unit converters are simultaneously conducting based on the detection result; and
- disabling, by the controller, the determined upper and lower switching elements by means of a control signal that is generated to turn off the operation of the respective unit converters.

18. The power supply method as claimed in claim 17, wherein the turning off the operation of the respective unit converters blocks the input power that is input to the respective unit converters.

* * * * *